(12) United States Patent
Furtuna et al.

(10) Patent No.: US 12,273,795 B2
(45) Date of Patent: Apr. 8, 2025

(54) PROPERTY COMMUNICATION AND ACCESS CONTROL

(71) Applicant: Alarm.com Incorporated, Tysons, VA (US)

(72) Inventors: Andrei Aurelian Furtuna, Annandale, VA (US); Matthew Daniel Correnti, Newtown Square, PA (US)

(73) Assignee: Alarm.com Incorporated, Tysons, VA (US)

( * ) Notice: Subject to any disclaimer, the term of this patent is extended or adjusted under 35 U.S.C. 154(b) by 0 days.

(21) Appl. No.: 18/505,359

(22) Filed: Nov. 9, 2023

(65) Prior Publication Data

US 2024/0073656 A1    Feb. 29, 2024

Related U.S. Application Data

(63) Continuation of application No. 17/322,200, filed on May 17, 2021, now Pat. No. 11,856,491.
(Continued)

(51) Int. Cl.
| | |
|---|---|
| H04W 4/12 | (2009.01) |
| G06F 18/22 | (2023.01) |
| G06V 20/52 | (2022.01) |
| G06V 40/10 | (2022.01) |
| G07C 9/00 | (2020.01) |
| G07C 9/33 | (2020.01) |
| H04W 4/16 | (2009.01) |
| H04W 4/30 | (2018.01) |

(52) U.S. Cl.
CPC ............. *H04W 4/30* (2018.02); *G06F 18/22* (2023.01); *G06V 20/52* (2022.01); *G06V 40/10* (2022.01); *G07C 9/00563* (2013.01); *G07C 9/33* (2020.01); *H04W 4/16* (2013.01)

(58) Field of Classification Search
CPC ...... H04W 4/16; H04W 4/30; G07C 9/00309; G07C 9/00563; G07C 9/00896; G07C 9/33; G06V 20/52; G06V 40/10; G06F 18/22; A47G 2029/145; A47G 29/141; A47G 29/20; A47G 29/30; B64F 1/18; B64F 1/32; B64U 2101/30; B64U 2101/64; B64U 2201/20; B64U 70/95; B66B 13/143; B66B 13/26
See application file for complete search history.

(56) References Cited

U.S. PATENT DOCUMENTS

| | | | | |
|---|---|---|---|---|
| 5,284,225 A | * | 2/1994 | Platt | ................... B66B 13/143 |
| | | | | 187/316 |
| 11,222,214 B2 | * | 1/2022 | To | ........................ G06V 40/10 |

(Continued)

*Primary Examiner* — Dionne Pendleton
(74) *Attorney, Agent, or Firm* — Fish & Richardson P.C.

(57) ABSTRACT

Methods, systems, and apparatus, including computer programs encoded on computer-storage media, for property communication and access control. In some implementations, a corresponding method includes receiving a data sequence input from a property related to an event at the property; comparing the data sequence input to one or more sequence templates to determine a matching sequence template; based on the matching sequence template, determining one or more relevant actions to be performed; performing the one or more relevant actions using the data sequence input; and providing feedback related to the event or the one or more relevant actions.

20 Claims, 3 Drawing Sheets

Related U.S. Application Data

(60) Provisional application No. 63/025,465, filed on May 15, 2020.

(56) References Cited

U.S. PATENT DOCUMENTS

| | | |
|---|---|---|
| 11,310,226 B2 | 4/2022 | Nair et al. |
| 11,399,021 B2 | 7/2022 | Endler et al. |
| 11,627,289 B1 * | 4/2023 | Siminoff ................ H04N 7/183 348/155 |
| 2012/0299700 A1 | 11/2012 | Davis et al. |
| 2014/0164256 A1 | 6/2014 | Booij et al. |
| 2017/0085844 A1 | 3/2017 | Scalisi et al. |
| 2018/0367962 A1 * | 12/2018 | Gilmartin .............. G06V 40/10 |
| 2021/0125438 A1 | 4/2021 | Ehrlich |
| 2021/0217438 A1 | 7/2021 | Mensah et al. |
| 2021/0267400 A1 * | 9/2021 | Hall ....................... A47G 29/20 |

* cited by examiner

PROPERTY COMMUNICATION AND ACCESS CONTROL

CROSS-REFERENCE TO RELATED APPLICATIONS

This application is a continuation of U.S. application Ser. No. 17/322,200, filed May 17, 2021, now allowed, which claims the benefit of U.S. Provisional Application No. 63/025,465, filed on May 15, 2020. The disclosure of each of the foregoing applications is incorporated herein by reference.

BACKGROUND

Many properties are equipped with monitoring systems that include sensors and connected system components.

SUMMARY

Techniques are described for a property communication and access control system. The system can include data collecting elements such as cameras, microphones, keypads, or other elements. The system allows a user to go to a property, provide data to one or more of the data collecting elements, and subsequently communicate with a person associated with the property or gain access to the property. The data collecting elements are used by a control unit to determine one or more relevant actions related to the data collected by the one or more data collecting elements. Actions include, for example, unlocking a door of the property or connecting a visitor of the property with a resident of the property.

The data collected by the one or more data collected elements are processed by one or more elements of the control unit. Based on the processing of the control unit, one or more relevant actions are determined and performed by the control unit. In some implementations, the control unit delegates one or more tasks to one or more other systems to be performed by the one or more other systems.

In some implementations, one or more smartphones are used to provide audio and visual data within a communication between one or more users. For example, the one or more smartphones can have preinstalled an application that enables the one or more smartphones to communicate with the control unit. The control unit manages the data provided and received from the one or more smartphones.

In some implementations, security elements on a property are used to enable communication or an action on the property. For example, security elements such as cameras, microphones, or keypads can be used to receive data provided by a user. Door locks can be used to enable remote locking and unlocking of one or more doors by the control unit. In some cases, the control unit remotely locks or unlocks a door as part of, or while performing, one or more actions. The security elements can be a form of data collecting elements. The security elements can be connected to the control unit or connected to a network connected to the control unit.

One innovative aspect of the subject matter described in this specification is embodied in a method that includes receiving a data sequence input from a property related to an event at the property; comparing the data sequence input to one or more sequence templates to determine a matching sequence template; based on the matching sequence template, determining one or more relevant actions to be performed; performing the one or more relevant actions using the data sequence input; and providing feedback related to the event or the one or more relevant actions.

Other implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

The foregoing and other embodiments can each optionally include one or more of the following features, alone or in combination. For instance, in some aspects the data sequence input may be a sequence entered by a user on a keypad affixed to a device on the property. In some aspects, the matching sequence template corresponds to contacting one or more users associated with the property and the one or more relevant actions may include: comparing the data sequence input to one or more stored sequences to determine a matching stored sequence; and sending a signal to a device associated with the matching stored sequence.

In some aspects, the matching sequence template corresponds to contacting one or more users associated with the property and the one or more relevant actions may include: comparing the data sequence input to one or more stored sequences to determine a matching stored sequence; in response to determining the matching stored sequence, initiating a first call with a first user and a second call with a second user; and merging the first call with the second call to allow communication between the first user and the second user.

In some aspects, the actions may include: receiving an unlocking signal from a device of the second user after merging the first call with the second call; and in response to receiving the unlocking signal from the device of the second user, unlocking a door of the property.

In some aspects, initiating the first call with the first user and the second call with the second user may include: obtaining one or more images of the first user; determining, based on at least the one or more images, a unique identifier of the first user; and initiating the first call with the first user based on the unique identifier of the first user.

In some aspects, the unique identifier of the first user may include: a phone number registered to the first user.

In some aspects, the actions may include: obtaining one or more images of a user that entered the data sequence input; performing analysis on the one or more images to determine one or more objects in the one or more images; and based on the one or more objects and the matching sequence template, determining the one or more relevant actions to be performed.

In some aspects, determining the one or more objects in the one or more images may include: identifying the user that entered the data sequence input with an identity based on the one or more images; and determining the one or more relevant actions to be performed based on the identity.

In some aspects, determining the one or more relevant actions to be performed may include: determining the one or more objects match one or more stored objects associated with a first set of relevant actions; and in response to determining the one or more objects match the one or more stored objects associated with the first set of relevant actions, determining the one or more relevant actions to be performed from the first set of relevant actions based on the matching sequence template.

In some aspects, the one or more sequence templates may include: a first template that includes one or more character prefixes and a minimum character requirement.

In some aspects, the one or more sequence templates may include: a second template that includes a maximum character limit requirement.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
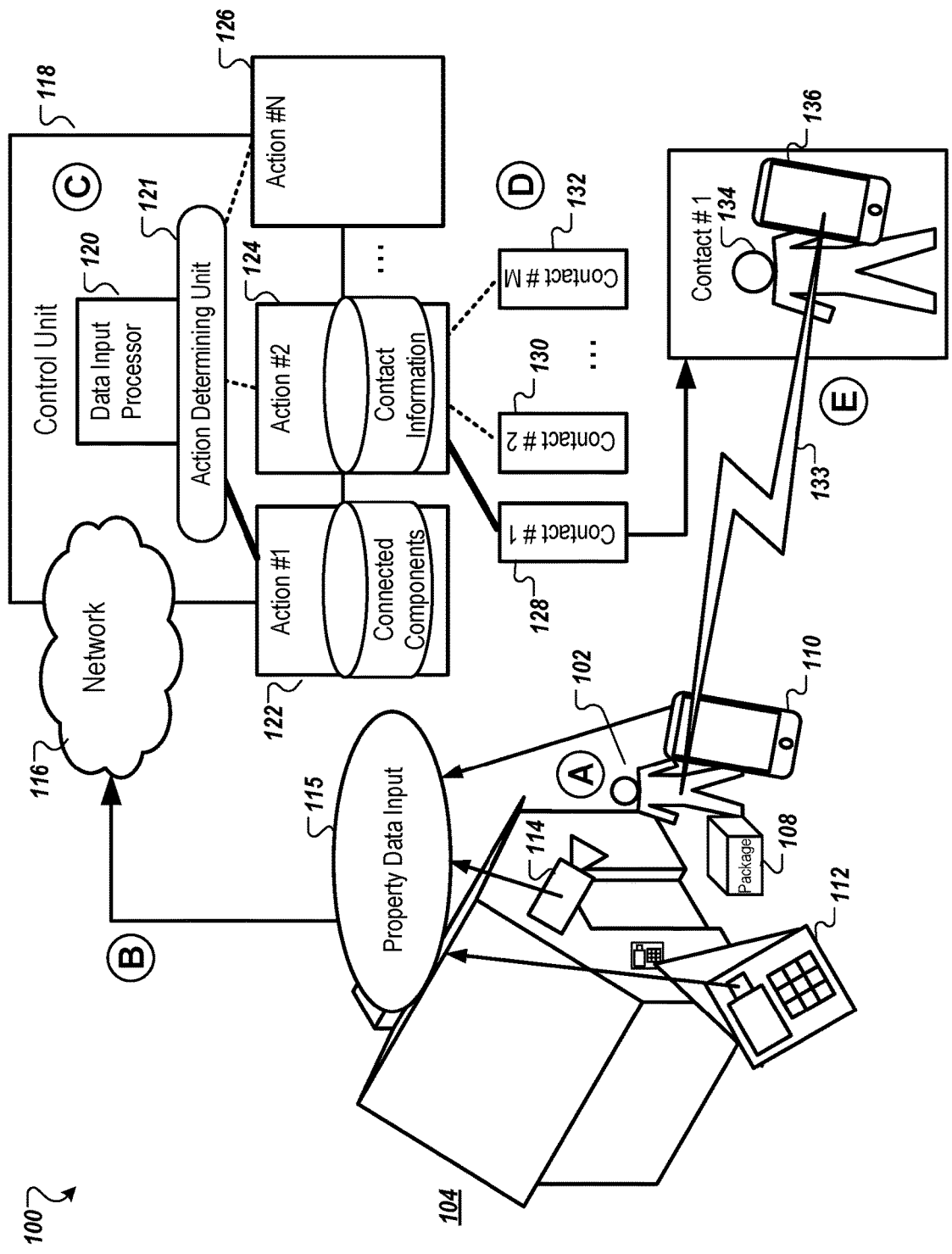
FIG. 1 is a diagram showing an example of a system for property communication and access control.

FIG. 1 is a diagram showing an example of a system 100 that includes a user 102, a property 104, a package 108, a smartphone 110, a keypad 112, a camera 114, property data input 115, a network 116, a control unit 118, a data input processor 120, an action determining unit 121, a first action 122, a second action 124, an Nth action 126, a first contact 128, a second contact 130, an Mth contact 132, a first contact user 134, and a first contact user smartphone 136.

The keypad 112 includes buttons that, when pushed, send data signals to the control unit 118 through the wired or wireless network 116. The camera 114 captures visual data on the property 104 and transfers the visual data to the control unit 118 through the wired or wireless network 116. In some implementations, the property 104 has more or less elements within the system 100 capable of capturing data and sending data to the control unit 118.

Stage A in FIG. 1 shows the package 108 being delivered by the user 102 to the property 104. The user 102 is holding the smartphone 110. Elements within the system 100 including the keypad 112, the camera 114 and the smartphone 110 are used to capture data related to the user 102. In FIG. 1, the camera 114 captures visual data of the user 102. The keypad 112 captures a sequence entered by the user 102 on the keypad 112. The smartphone 110 sends signals that are captured by a receiving unit of the system 100.

In some implementations, the sequence entered by the user 102 on the keypad 112 may correspond to one or more sequence templates. For example, the user 102 can enter one or more prefix characters, such as a star, pound symbol, or one or more other symbols, followed by a sequence. The sequence can identify one or more users associated with the system 100 or the property 104. In some implementations, a sequence includes a phone number of the user 102 attempting to contact a user of the property 104, such as the first contact user 134. The system 100 can determine that the sequence entered by the user 102 corresponds to a template for establishing a group call and can use the sequence entered by the user 102 to establish the group call.

In some implementations, the smartphone 110 communicates directly with the control unit 118. For example, the smartphone 110 may have an application preinstalled that communicates with the control unit 118. In other implementations, a receiving unit captures data from the smartphone 110 and transfers the captured data to the control unit 118. For example, a radio signal receiver detects radio signals or other forms of communication emitted from the smartphone 110 and transfers data related to the detected radio signals or other forms of communication emitted from the smartphone 110 to the control unit 118.

Stage B shows the property data input 115 being sent to the network 116. The property data input 115 includes one or more visual images of the user 102 captured by the camera 114, a sequence of inputs entered by the user 102 into the keypad 112, and a signal sent by the smartphone 110 to a receiving unit on the property 104.

In some implementations, more or less data is sent to the network 116. For example, an admin of the system can choose what type of data to collect at the property 104. The elements of data can also be determined based on the number or type of data collecting elements installed within the system 100.

The network 116 may be configured to enable exchange of electronic communications between the control unit 118 and the one or more elements of the system 100 including the keypad 112, the camera 114, and the smartphone 110. The network 116 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data.

Stage C shows the network 116 that is connected to the control unit 118. The control unit 118 includes the data input processor 120 and the action determining unit 121. The data input processor 120 receives the property data input 115 over the network 116. The data input processor 120 then processes the data. The data input processor 120 receives the one or more visual images of the user 102 captures by the camera 114. The data input processor 120 uses visual data processing, including visual recognition algorithms, to determine the one or more visual images of the user 102 captured by the camera 114 are, in fact, images of the user 102. The data input processor 120 further determines that the user 102 is approaching an entrance of the property 104 and the user 102 is carrying a package 108. The data input processor 120 further determines that the user 102 is a delivery person. By matching visual images of the user 102 with saved images of delivery uniforms, processing visual images of the user 102 to extract key elements that are then compared with key elements of a delivery uniform, or processing various other data elements including determinations that the user 102 is a carrying the package 108, the data input processor 120 is able to identify the user 102 as a delivery person.

In some implementations, other data is used to determine the identity or purpose of the user 102. For example, an identification card can be scanned by the user 102. Data related to the identification card is sent to the control unit 118. The control unit 118 then determines the identity or purpose of the user 102.

The data input processor 120 further receives the sequence entered by the user 102 at the keypad 112. The sequence is sent with the property data input 115. The data input processor 120 cross references the inputs entered into the keypad 112 with one or more lists of predefined sequences in a database. A match is found between the sequence entered into the keypad 112 and a predefined sequence in the database corresponding to a request to communicate with another user. In this example, the sequence entered by the user 102 into the keypad 112 began with a pound symbol and ended with a star symbol. This corresponded with a predefined sequence in the system 100 for contacting another user.

In some implementations, the data from the property 104 is sent individually to the control unit 118. For example, instead of receiving the property data input 115, the control unit 118 receives data from the keypad 112, the camera 114, the smartphone 110 or any other data capturing element at the property 104 as separate received signals.

In some implementations, other sequences can correspond with other actions. For example, other sequences can enable the user to unlock an entrance to a property. In some implementations, actions performed by one or more elements of the system 100 depend on one or more data signals collected by the system 100. For example, a sequence entered into the keypad 112 is associated with a sequence to open a door of the property 104 but the action of opening the door of the property 104 may be prevented by one or more other data signals or logic performed by the control unit 118. When a sequence for opening the door of the property 104 is entered after 11:00 PM, for example, the system 100 may have logic in place to not open the door of the property 104 even if the code is correct. In some cases, operations can have back up methods of activation. For example, if after 11:00 PM, a user needs to open the door of the property 104, confirmation of a unique user identity entered into the keypad 112 can override a prevention imposed by one or more elements of the system 100.

The data input processor 120 further receives data related to the signal sent by the smartphone 110. The receiving unit on the property 104 is capable of detecting signals sent from the smartphone 110. The signal sent by the smartphone 110 is a form of Bluetooth signal carrying data about the smartphone 110. The data input processor 120 determines by the strength associated with the signal sent by the smartphone 110 that the smartphone 110 is at the property 104. By processing the data related to the signal sent by the smartphone 110, the control unit 118 determines the smartphone 110 is an eligible input/output device for establishing a communication between the user 102 and another user with both audio and video—functions supported by the smartphone 110.

In some implementations, the signal sent by the smartphone 110 is another form of signal. For example, the signal can include Wi-Fi, cellular signals, ultra-wide band (UWB), etc. In some implementations, other aspects of the signal from the smartphone 110 are used in determinations made by the control unit 118. For example, the signal from the smartphone 110 contains location information that, instead of a strength of the signal, is used to confirm a location of the smartphone 110 and, by extension, the user 102.

The data input processor 120 uses an action determining unit 121 to choose from available actions. The available actions for the system 100 include the first action 122, the second action 124, and an Nth action 126. The Nth action 126 represents that the system 100 includes one or more actions. The first action 122 involves connected components. The connected components are elements of the system 100 that are connected to the control unit 118 and are therefore controllable by the control unit 118. Depending on the implementation, the first action 122 involves opening a door of the property 104, contacting emergency personnel, or other actions. The second action 124 involves accessing contact information. The data input processor 120 determines that a communication is requested from the user 102 as described above. In this example, the sequence entered on the keypad 112 is used in the second action 124.

Stage D of FIG. 1 shows the second action 124 accessing contact information. The second action 124 is managed by the control unit 118. The sequence entered by the user 102 into the keypad 112 is used to cross reference existing contacts in the contact information database accessible by the control unit 118. A match between the sequence entered by the user 102 and the first contact 128 is found by the control unit 118. The sequence entered by the user 102 does not match the second contact 130 or the Mth contact 132. The Mth contact 132 represents that the second action 124 includes one or more contacts. The match between the sequence entered by the user 102 and the first contact 128 is used by the control unit 118 to establish a communication connection 133 between the user 102 and the first contact user 134.

Stage E of FIG. 1 shows the connection 133 between the user 102 and the first contact user 134. The connection 133 connects the smartphone 110 and the first contact user smartphone 136. In some implementations, the connection 133 is between another element of the property 104 and the first contact user smartphone 136. For example, the camera 114 can be used to send visual images to the first contact user smartphone 136. The first contact user smartphone 136 has software installed which communicates with the control unit 118. The software is used to create a notification on the first contact user smartphone 136 alerting the first contact user 134 that a call from the property 104 is incoming. The first contact user 134 uses the software to communicate with the user 102. The first contact user 134 is given information by the software on the first contact user smartphone 136 that includes information based on the property data input 115. The first contact user 134 is notified that the user 102 is a delivery man with a package 108. Communicating over the connection 133 is used to confirm that the user 102 is a delivery man with a package 108 and to allow the first contact user 134 to give special delivery instructions. The software on the first contact user smartphone 136 includes interactive buttons for the first contact user 134. The interactive buttons include a button to unlock a door of the property 104. The first contact user 134 presses the button to unlock the door of the property 104 and the user 102 enters through the door of the property 104 and deposits the package 108.

In some implementations, the connection 133 between the user 102 and the first contact user 134 may be initiated by the control unit 118 or one or more other computer elements associated with the system 100. For example, the control unit 118 can use the sequence entered by the user 102 to separately establish a connection with the first contact user 134 and a connection with the user 102. After separately establishing the connections, the control unit 118 can merge the connections to enable data sent from a device of the first contact user 134 to be received by a device of the user 102 and data sent by a device of the user 102 to be received by a device of the first contact user 134. Instead of directly connecting the user 102 with the first contact user 134, the separate initialization and merging allows for greater flexibility and efficiency in handling property events. For example, the user 102 need only remember their own unique identifier and enter the unique identifier, such as a phone number, as a sequence at the keypad 112.

In some implementations, data within an entered sequence or data captured around the property can be used to determine whether or not to merge multiple initiated communication connections. For example, the user 102 may enter one or more characters that are used to determine which users or devices, of one or more relevant users or devices associated with the property 104, to establish a connection with. Taking providing a phone number as an example, the user 102 can include, in addition to a phone number corresponding to the user 102, one or more characters that designate a particular user associated with the property 104 as the user to be connected with or a particular device of the user based on settings of the system 100.

In some implementations, data captured around the property can be used to determine whether or not to merge multiple initiated communication connections. For example, camera footage obtained by the camera 114 can be processed by the control unit 118 to determine what objects are at the property 104. Based on the objects detected, the control unit 118 can determine further actions to perform. The control unit 118 can determine an identity of the user 102 and use the determined identity of the user 102 together with the sequence entered by the user 102 in order to determine who to connect with or how to connect. In some cases, instead of calling a number of a cellular device of the user 102, the control unit 118 initiates a connection with an audio or video device, such as the keypad 112, at the property 104 based on the location of the user 102 determined from video footage.

In some implementations, the connection with the first contact user 134 can be initiated by matching the sequence entered by the user 102 to another sequence stored as contact information and that is associated with the first contact user 134. The contact information can be stored in a server communicably connected to the control unit 118. The control unit 118 can query for one or more contacts related to the sequence entered by the user 102, such as contacts that have designated the sequence entered by the user 102 or the user 102 as an element of a known contact or a known contact, respectively.

In some implementations, further sensors give notifications to the first contact user 134. For example, a motion sensor at the door of the property 104 can be used to determine if or when the user 102 enters the property 104. The motion sensor can also be used to determine if or when the user 102 leaves the property 104. By comparing multiple data inputs, for example, a timestamp of when the user 102 enters the property 104 and a timestamp of when the user 102 leaves the property 104, the control unit 118 can determine how long the user 102 was in the property 104. In some cases, a threshold can be used to determine if the user 102 spends an irregular amount of time in the property 104. Other data input elements on the property 104 can retrieve data used in other calculations. For example, the camera 114 can use visual analysis to detect the user 102 entering and leaving the property 104. Notifications concerning the activities of the user 102, including nominal reports, can be sent to the first contact user 134 by the control unit 118 to the first contact user smartphone 136.

In some implementations, timing delays are used to maintain security at the property 104. For example, in the case where a resident of a unit within the property 104 opens the door for someone requesting access to the unit, a calculated time delay between unlocking the front door and unlocking the door of the unit within the property 104 can be used that accounts for a reasonable travel time from the front door to the unit. For another example, a command sent to the lock on a door of the unit can enable the door of the unit to unlock if a person presses a key on the keypad of the door within a given time frame (e.g. 30 seconds).

In some implementations, processes performed by the control unit 118 are delegated to other systems connected to the control unit 118. For example, the stored contact information of the second action 124 can be stored in a remote server contactable by the control unit 118. The control unit 118 can use information gathered from the remote server to perform further action or delegate one or more actions to one or more other systems.

In some implementations, the user 102 is not carrying a smartphone. For example, the user 102 goes to the property 104 without a smartphone and is able to be detected by the system 100 and communicate with the first contact user 134.

In some implementations, more or less data collecting elements are active and sending data to the control unit 118. Examples of data collecting elements include the keypad 112, the camera 114, and the smartphone 110. For example, the camera 114 can be removed from the system 100. The user 102 uses the keypad 112, or another additional element of the system 100, to communicate with the control unit 118.

In some implementations, elements of the system 100 are elements of a gateway device that support wired sensors and communicates with a backend processor or the control unit 118. The gateway device can be used to connect to an element such as the control unit 118. The gateway device can be connected to the keypad 112 or other elements of the system 100.

In some implementations, a printed sign listing sequences, including numbers, corresponding to various persons or users is placed at the property 104. The sequences can be virtual phone numbers. In some cases, only a single number is listed. A user calling the single number listed then enters in a subsequent sequence of numbers corresponding to a second person or user. The subsequent sequence of numbers can be listed and placed at the property 104 or similarly made available to a user virtually through a website or application. After entering the subsequent sequence of numbers corresponding to the second person or user, the user is connected with the second person or user.

In some implementations, specific persons or users are designated with privileges related to the property communication and access control. For example, one or more users may be given the ability to receive calls from the property 104 or elements connected to the property 104. Sequences associated with the persons or users designated can be assembled and printed for the purposes mentioned above.

In some implementations, a first user uses a personal phone to call a listed number of a second user or person associated with the property 104. The first user confirms their location at the property 104. In some cases, this can involve pressing a button on the keypad 112. The location at the property 104 of the first user is used by the control unit 118 to enable interactive services for the second user or entity associated with the property. The second user associated with the property receives a notification by an application downloaded to their smartphone. By using this application, the second user unlocks the door for the first user or completes another action such as unlocking a mail drop box.

In some implementations, the camera 114 is used for one way video communicating with the first contact user 134. In some cases, the camera 114 can be a form of doorbell camera or similar property appliance. For example, the first contact user 134 receives video footage from the camera 114 of the user 102 when the user 102 is at the property 104.

In some implementations, when a sequence is entered in the keypad 112 by a first user, the control unit 118 matches the sequence to a contact corresponding to a second person or user. A relay that operates a doorbell call button is activated by the control unit 118. A doorbell camera associated with the doorbell call button contacts the control unit 118. After the sequence entered in the keypad 112 is matched to the contact, a call is initiated allowing the first user near the doorbell camera to communicate with the contact corresponding to the second person or user. During the call, interactive controls on a device of the second person or user are used to perform actions such as temporarily unlocking a door.

In some implementations, individual buttons associated with particular lines of communication are located on the property 104 or on another electronic device. The individual buttons route communication between one user and anther user, for example, the user 102 and the first contact user 134. In some cases, a button for a particular resident can be added to the keypad 112 such that, when pushed, a person can be in communication with the particular resident. In other cases, a button for emergency services can be added such that if a person pushes the button for emergency services, emergency personnel are dispatched to, or communicate with, the person that pushed the button for emergency services at the property 104.

In some implementations, video analytics are used to confirm the location of a user at a property. For example, the user 102 approaches the property 104. The user dials a number from a directory into the keypad 112. A voice emitted from a device on the property 104 prompts the user 102 to make a specific gesture (e.g. wave hands above head, turn around, etc.). The camera 114 uses video analytics to determine if the user 102 performs the specific gesture. If the gestures is detected within a designated time frame, a physical presence and door location of the user 102 is confirmed. This is particularly useful in situations where a property has more than one door.

In some implementations, a scanner is used to recognize a credential sent to a user's device and produce a certain action in the system 100. For example, a QR code sent to a delivery man. The QR code is scanned by a scanner on the property 104. Data related to the scan of the QR code is transferred to the control unit 118. The control unit 118 determines a relevant action related to the data received from the scanned QR code. The QR code is a 'non-entry request' to enter and does not unlock a door of the property 104. The control unit 118 issues a notification or call depending on the implementation, containing information about the delivery man to users associated with the property 104. In some cases, this can be an active intercom call that can be joined by users with access to intercom calling or a text notification sent to one or more users.

In some implementations, the first contact user 134 does not have access to a smartphone. In this case, another element connected to the control unit 118 can be used. For example, a security panel in a room with the first contact user 134 can be used to answer calls initiated from a front entrance of the apartment complex.

In some implementations, a user creates rules to control when or how information from the system 100 is received. For example, a first user can set a range of time to be unavailable. If a call initiated by a second user to connect to the first user is initiated during this range of time, the first user does not receive the call. In some cases, the control unit 118 issues a message to the second user that the first user being called is unavailable. In some implementations, data collected by a system can influence how a user receives information. For example, if a resident is away from home or security system is armed, depending on implementations, this can be a signal to the control unit 118 to make the resident or user unavailable.

In some implementations, z-wave technology is used by the control unit 118. For example, devices communicating with z-wave technology can be controlled to perform actions determined by the control unit 118.

In some implementations, neither the user 102 nor the first contact user 134 calls each other directly. Instead, the control unit 118 merges the user 102 and the first contact user 134 into a call.

In some implementations, video analytics are used to determine if the user 102 is registered on a black list. If the user 102 is determined to be a member of one or more black lists monitored by the system 100, the user 102 can be prevented from communicating with one or more elements of the system 100. For example, an admin or another user associated with the system 100 can add one or more persons to a black list. In some cases, black lists for individual users can be kept such that a first user does not accept calls from a first blacklisted user but a second user does accept calls from the first blacklisted user. Visual data of blacklisted users are stored such that if new property data is received matching elements of the visual data corresponding to one or more blacklisted users, the one or more blacklisted users are prevented from communicating with one or more elements of the system 100.

In some implementations, a microphone at the property 104 can be used to relay audio information to the control unit 118. For example, a microphone can be used to receive one or more questions from the user 102. The one or more questions can either be automatically answered with voice recognition software or relayed to a human monitor that can respond to the one or more questions.

Figure 2:
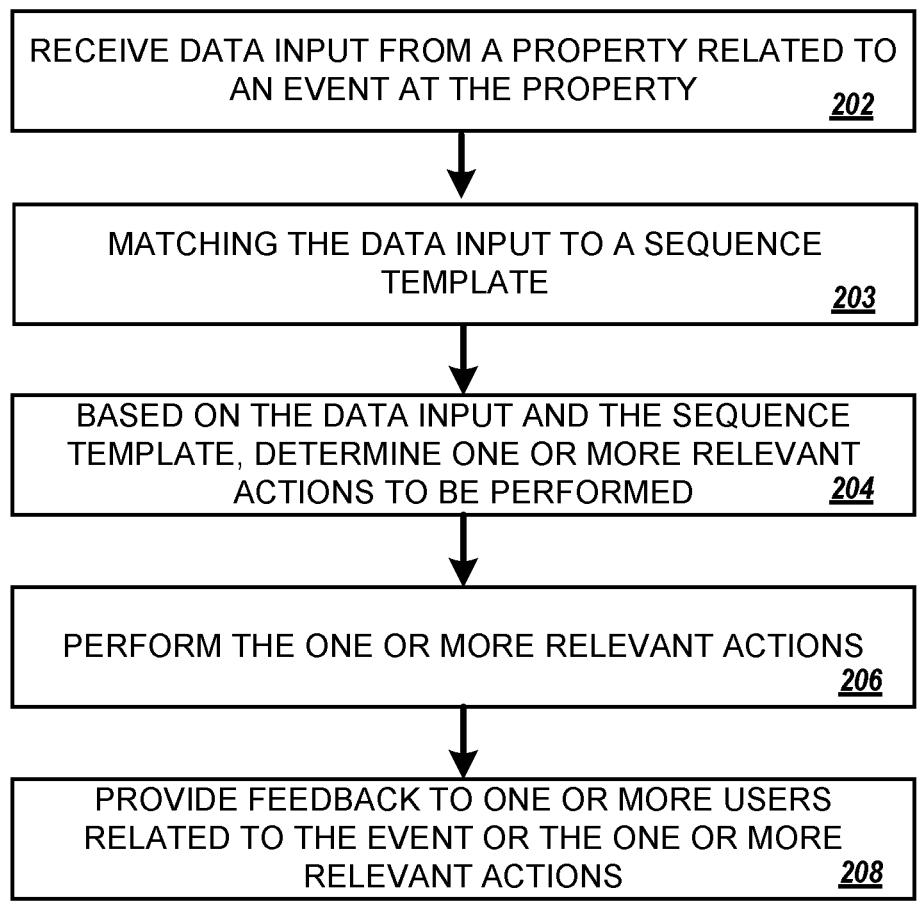
FIG. 2 is a flow diagram illustrating an example of a process for property communication and access control.

FIG. 2 is a flow diagram illustrating an example of a process 200 for property communication and access control. The process 200 is applied to the system 100 of FIG. 1.

The process 200 includes receiving data input from a property related to an event at the property (202). For example, the user 102 goes to the property 104. The property data input 115 from the keypad 112, the camera 114, and the smartphone 110 is received by the control unit 118. The property data input 115 is related to the user 102 at the property 104.

The process 200 includes matching the data input to a sequence template (203). For example, as shown in FIG. 1, the control unit 118 can receive a number of characters from the user 102. The control unit 118 can further determine the number is above a threshold or within a range. Based on the number of characters, the control unit 118 can determine what sequence template is associated with the sequence entered. In another example, the control unit 118 can parse the sequence entered by the user to determine whether or not a sequence of characters designating a particular template are present. Based on the presence or omission of such sequence of characters, the control unit 118 can determine what sequence template is associated with the sequence entered.

In some implementations, the user 102 enters a sequence of numbers that includes a unique identifier. For example, the data sequence input may be a sequence entered by a user on a keypad affixed to a device on a property. The unique identifier can be a phone number used to communicate with a device of the user 102, such as the smartphone 110. The unique identifier can be an account identifier used to determine an account corresponding to the user 102 and to establish a communication connection using an application on a device of the user 102.

In some implementations, one or more templates are stored in one or more components of the system 100 and are associated with one or more actions to be performed. For example, a first template can be determined based on a minimum number of characters entered in a sequence, such as 10 characters, and can be associated with parsing the sequence entered to extract a phone number from the sequence. In another example, a second template can be determined based on one or more character sequences, such as a prefix or suffix sequences, and can be parsed to extract elements of the sequence not included in the known prefix or suffix.

In some implementations, a matching sequence template may correspond to contacting one or more users associated with the property and one or more relevant actions that include comparing data sequence input to one or more stored sequences to determine a matching stored sequence; and sending a signal to a device associated with the matching stored sequence.

In some implementations, a matching sequence template may correspond to contacting one or more users associated with the property and one or more relevant actions may include comparing data sequence input to one or more stored sequences to determine a matching stored sequence; in response to determining the matching stored sequence, initiating a first call with a first user and a second call with a second user; and merging the first call with the second call to allow communication between the first user and the second user. The process 200 includes determining one or more relevant actions to be performed based on the data input and the sequence template (204). For example, the data input processor 120 and the action determining unit 121 of the control unit 118 determine, based on the property data input 115, the second action 124 is the action to be performed.

In some implementations, as discussed in FIG. 1, visual data can be processed to determine what actions to perform. For example, the camera 114 can obtain visual data that is sent as data input to the control unit 118. The visual data can be processed to identify one or more objects including the package 108 and the user 102. The identifications of one or more objects in the visual field of the camera 114 can be used to determine what actions to perform. For example, if the user 102 is identified as a delivery person, only a designated delivery person handler for the property may be connected into a call or prompted to unlock a door of the property 104. In another example, if the user 102 is identified as a relative or known contact, one or more parties associated with the property 104 can be notified or merged into a communication channel based on a unique identifier provided in the sequence entered by the user 102. In this way, only relevant parties are alerted and the property visitor need only remember their unique identifier that has been associated with relevant personnel in order to establish communication or have an unlocking request confirmed.

In some implementations, objects identified based on visual data can be used to determine one or more actions. For example, the control unit 118 can identify the package 108 in FIG. 1 and, after identifying the package 108, can determine that an object such as the package 108 is associated with the action of alerting a user responsible for package delivery at the property 104. In some implementations, the user 102 can enter a sequence on the keypad 112 in order to discuss the package 108 or delivery issues with a user responsible for package deliveries or preconfigured to handle package deliveries, such as the first contact user 134 or can simply enter an access request code which can be confirmed or denied by the control unit 118 or the first contact user 134. For example, the control unit 118 can establish a communication connection with the first contact user 134 without receiving a unique identifier, such as a phone number, included in the sequence entered by the user 102. Both (i) a generic access sequence or (ii) no sequence and the identification of the user 102 or the package 108 can trigger establishing connection with the first contact user 134 where the first contact user 134 can determine whether or not to allow access.

The process 200 includes performing the one or more relevant actions (206). For example, the control unit 118 performs the second action 124. The second action 124 involves connecting the user 102 with the first contact user 134. In some implementations, the control unit 118 can use previously stored relationships between an identifier included in the sequence entered by the user 102 or other data obtained by sensors such as the camera 114, to determine what users to contact instead of relying on the user 102 to enter exact information for initiating communication with another user directly. In this way, the system 100 can improve property communication systems by not requiring specific codes for communicating with specific people but rather allowing a unique visitor code, such as a visitor phone number, to initiate communications with relevant users based on previously established associations or object identifiers determined by visual data.

In some implementations, other actions or combinations of actions are possible. For example, the control unit 118 can automatically unlock the door for a person or user. In this example, the control unit 118 can process one or more items of received data to determine if the door should be unlocked for the person or user. When one or more criteria of the received data is met, the control unit 118 can activate a mechanism to unlock the door. In some cases, the door opening action is prompted by a signal sent from a user currently in communication with a visitor such as the user 102 after communication connections have been merged by the control unit 118.

The process 200 includes providing feedback to one or more users related to the event or the one or more relevant actions (208). For example, an interactive button on the first contact user smartphone 136 is pushed by the first contact user 134. The interactive button unlocks the door for the user 102. The control unit 118 notifies the first contact user 134 that the door of the property 104 has been unlocked and the user 102 has entered the building.

In some implementations, users not included in the communication can be notified after communication ends. For example, based on the sequence entered by the user 102 or identification determinations made based on input from sensors, the control unit 118 can separately establish communication channels with the user 102 and the first contact user 134 and subsequently merge the separately established communication channels. Although the first contact user 134 is selected, there may be other contacts that are associated with the property 104. After communication is ended by the control unit 118, the user 102, or the first contact user 134, the control unit 118, the control unit 118 can send a notification to the other contacts that are associated with the property according to one or more stored user settings.

In some implementations, one or more other data input devices are used to inform feedback on the event or the one or more relevant actions. For example, a motion sensor installed in the door way of the property 104 can be used to detect if and when the user 102 enters the property 104. The signal from the motion sensor is sent to the control unit 118. The control unit 118 sends feedback related to the signal sent from the motion sensor to one or more users including the first contact user 134.

Figure 3:
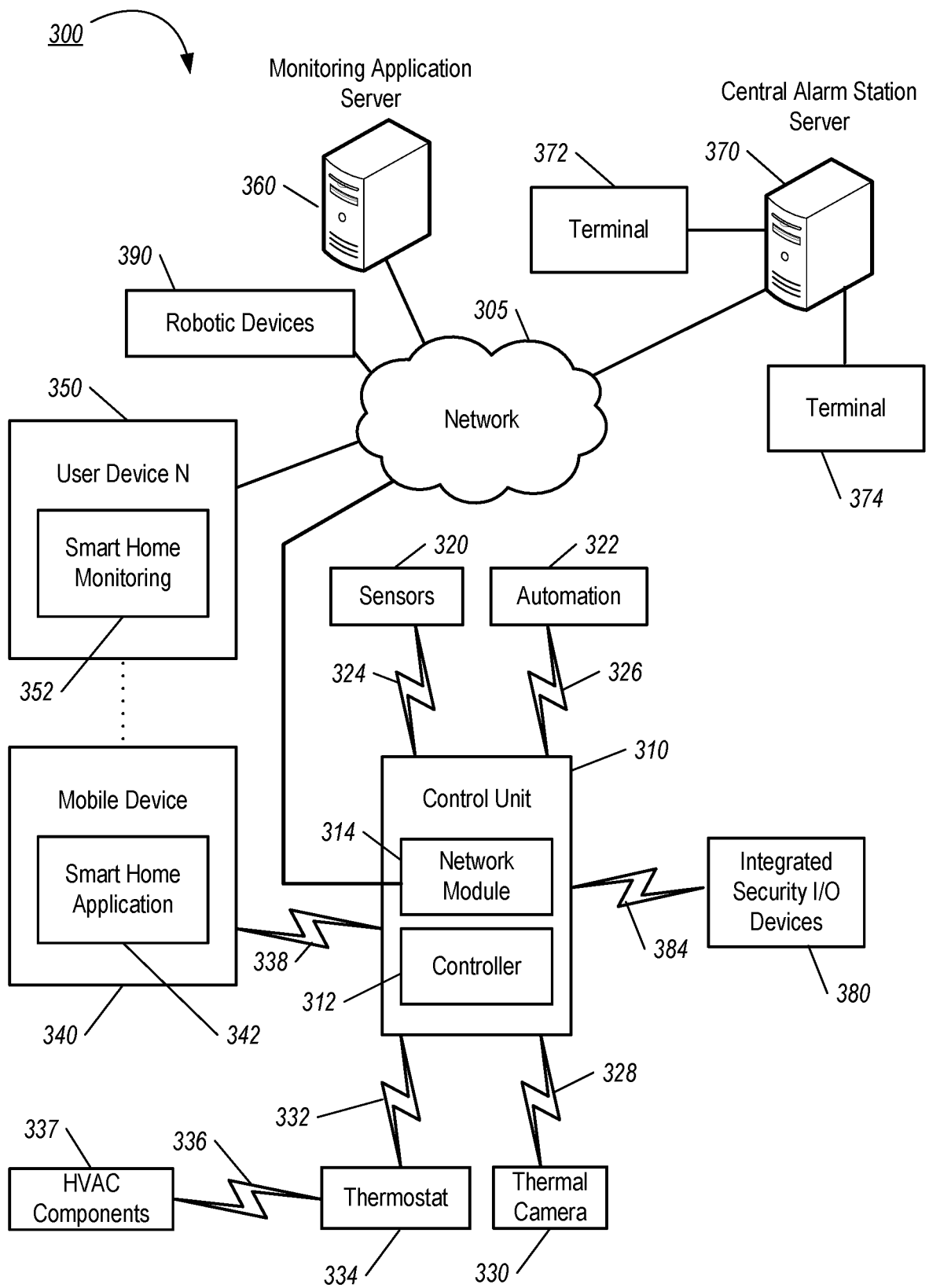
FIG. 3 is a diagram illustrating an example of a property monitoring system.

FIG. 3 is a diagram illustrating an example of a property monitoring system. The network 305 is configured to enable exchange of electronic communications between devices connected to the network 305. For example, the network 305 may be configured to enable exchange of electronic communications between the control unit 310, the one or more user devices 340 and 350, the monitoring server 360, and the central alarm station server 370. The network 305 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. The network 305 may include multiple networks or subnetworks, each of which may include, for example, a wired or wireless data pathway. The network 305 may include a circuit-switched network, a packet-switched data network, or any other network able to carry electronic communications (e.g., data or voice communications). For example, the network 305 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 305 may include one or more networks that include wireless data channels and wireless voice channels. The network 305 may be a wireless network, a broadband network, or a combination of networks including a wireless network and a broadband network.

The control unit 310 includes a controller 312 and a network module 314. The controller 312 is configured to control a control unit monitoring system (e.g., a control unit system) that includes the control unit 310. In some examples, the controller 312 may include a processor or other control circuitry configured to execute instructions of a program that controls operation of a control unit system. In these examples, the controller 312 may be configured to receive input from sensors, flow meters, or other devices included in the control unit system and control operations of devices included in the household (e.g., speakers, lights, doors, etc.). For example, the controller 312 may be configured to control operation of the network module 314 included in the control unit 310.

The network module 314 is a communication device configured to exchange communications over the network 305. The network module 314 may be a wireless communication module configured to exchange wireless communications over the network 305. For example, the network module 314 may be a wireless communication device configured to exchange communications over a wireless data channel and a wireless voice channel. In this example, the network module 314 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 314 also may be a wired communication module configured to exchange communications over the network 305 using a wired connection. For instance, the network module 314 may be a modem, a network interface card, or another type of network interface device. The network module 314 may be an Ethernet network card configured to enable the control unit 310 to communicate over a local area network and/or the Internet. The network module 314 also may be a voice band modem configured to enable the alarm panel to communicate over the telephone lines of Plain Old Telephone Systems (POTS).

The control unit system that includes the control unit 310 includes one or more sensors 320. For example, the monitoring system may include multiple sensors 320. The sensors 320 may include a lock sensor, a contact sensor, a motion sensor, or any other type of sensor included in a control unit system. The sensors 320 also may include an environmental sensor, such as a temperature sensor, a water sensor, a rain sensor, a wind sensor, a light sensor, a smoke detector, a carbon monoxide detector, an air quality sensor, etc. The sensors 320 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the health monitoring sensor can be a wearable sensor that attaches to a user in the home. The health monitoring sensor can collect various health data, including pulse, heart-rate, respiration rate, sugar or glucose level, bodily temperature, or motion data.

The sensors 320 can also include a radio-frequency identification (RFID) sensor that identifies a particular article that includes a pre-assigned RFID tag.

The system 300 also includes one or more thermal cameras 330 that communicate with the control unit 310. The thermal camera 330 may be an IR camera or other type of thermal sensing device configured to capture thermal images of a scene. For instance, the thermal camera 330 may be configured to capture thermal images of an area within a building or home monitored by the control unit 310. The thermal camera 330 may be configured to capture single, static thermal images of the area and also video thermal images of the area in which multiple thermal images of the area are captured at a relatively high frequency (e.g., thirty images per second). The thermal camera 330 may be controlled based on commands received from the control unit 310. In some implementations, the thermal camera 330 can be an IR camera that captures thermal images by sensing radiated power in one or more IR spectral bands, including NIR, SWIR, MWIR, and/or LWIR spectral bands.

The thermal camera 330 may be triggered by several different types of techniques. For instance, a Passive Infra-Red (PIR) motion sensor may be built into the thermal camera 330 and used to trigger the thermal camera 330 to capture one or more thermal images when motion is detected. The thermal camera 330 also may include a microwave motion sensor built into the camera and used to trigger the thermal camera 330 to capture one or more thermal images when motion is detected. The thermal camera 330 may have a "normally open" or "normally closed" digital input that can trigger capture of one or more thermal images when external sensors (e.g., the sensors 320, PIR, door/window, etc.) detect motion or other events. In some implementations, the thermal camera 330 receives a command to capture an image when external devices detect motion or another potential alarm event. The thermal camera 330 may receive the command from the controller 312 or directly from one of the sensors 320.

In some examples, the thermal camera 330 triggers integrated or external illuminators (e.g., Infra-Red or other lights controlled by the property automation controls 322, etc.) to improve image quality. An integrated or separate light sensor may be used to determine if illumination is desired and may result in increased image quality.

The thermal camera 330 may be programmed with any combination of time/day schedules, monitoring system status (e.g., "armed stay," "armed away," "unarmed"), or other variables to determine whether images should be captured or not when triggers occur. The thermal camera 330 may enter a low-power mode when not capturing images. In this case, the thermal camera 330 may wake periodically to check for inbound messages from the controller 312. The thermal camera 330 may be powered by internal, replaceable batteries if located remotely from the control unit 310. The thermal camera 330 may employ a small solar cell to recharge the battery when light is available. Alternatively, the thermal camera 330 may be powered by the controller's 312 power supply if the thermal camera 330 is co-located with the controller 312.

In some implementations, the thermal camera 330 communicates directly with the monitoring server 360 over the Internet. In these implementations, thermal image data captured by the thermal camera 330 does not pass through the control unit 310 and the thermal camera 330 receives commands related to operation from the monitoring server 360.

In some implementations, the system 300 includes one or more visible light cameras, which can operate similarly to the thermal camera 330, but detect light energy in the visible wavelength spectral bands. The one or more visible light cameras can perform various operations and functions within the property monitoring system 300. For example, the visible light cameras can capture images of one or more areas of the property, which the cameras, the control unit, and/or another computer system of the monitoring system 300 can process and analyze.

The system 300 also includes one or more property automation controls 322 that communicate with the control unit to perform monitoring. The property automation controls 322 are connected to one or more devices connected to the system 300 and enable automation of actions at the property. For instance, the property automation controls 322 may be connected to one or more lighting systems and may be configured to control operation of the one or more lighting systems. Also, the property automation controls 322 may be connected to one or more electronic locks at the property and may be configured to control operation of the one or more electronic locks (e.g., control Z-Wave locks using wireless communications in the Z-Wave protocol). Further, the property automation controls 322 may be connected to one or more appliances at the property and may be configured to control operation of the one or more appliances. The property automation controls 322 may include multiple modules that are each specific to the type of device being controlled in an automated manner. The property automation controls 322 may control the one or more devices based on commands received from the control unit 310. For instance, the property automation controls 322 may interrupt power delivery to a particular outlet of the property or induce movement of a smart window shade of the property.

The system 300 also includes thermostat 334 to perform dynamic environmental control at the property. The thermostat 334 is configured to monitor temperature and/or energy consumption of an HVAC system associated with the thermostat 334, and is further configured to provide control of environmental (e.g., temperature) settings. In some implementations, the thermostat 334 can additionally or alternatively receive data relating to activity at the property and/or environmental data at the home, e.g., at various locations indoors and outdoors at the property. The thermostat 334 can directly measure energy consumption of the HVAC system associated with the thermostat, or can estimate energy consumption of the HVAC system associated with the thermostat 334, for example, based on detected usage of one or more components of the HVAC system associated with the thermostat 334. The thermostat 334 can communicate temperature and/or energy monitoring information to or from the control unit 310 and can control the environmental (e.g., temperature) settings based on commands received from the control unit 310.

In some implementations, the thermostat 334 is a dynamically programmable thermostat and can be integrated with the control unit 310. For example, the dynamically programmable thermostat 334 can include the control unit 310, e.g., as an internal component to the dynamically programmable thermostat 334. In addition, the control unit 310 can be a gateway device that communicates with the dynamically programmable thermostat 334. In some implementations, the thermostat 334 is controlled via one or more property automation controls 322.

In some implementations, a module 337 is connected to one or more components of an HVAC system associated with the property, and is configured to control operation of the one or more components of the HVAC system. In some implementations, the module 337 is also configured to monitor energy consumption of the HVAC system components, for example, by directly measuring the energy consumption of the HVAC system components or by estimating the energy usage of the one or more HVAC system components based on detecting usage of components of the HVAC system. The module 337 can communicate energy monitoring information and the state of the HVAC system components to the thermostat 334 and can control the one or more components of the HVAC system based on commands received from the thermostat 334.

In some examples, the system 300 further includes one or more robotic devices 390. The robotic devices 390 may be any type of robot that are capable of moving and taking actions that assist in home monitoring. For example, the robotic devices 390 may include drones that are capable of moving throughout a property based on automated control technology and/or user input control provided by a user. In this example, the drones may be able to fly, roll, walk, or otherwise move about the property. The drones may include helicopter type devices (e.g., quad copters), rolling helicopter type devices (e.g., roller copter devices that can fly and/or roll along the ground, walls, or ceiling) and land vehicle type devices (e.g., automated cars that drive around a property). In some cases, the robotic devices 390 may be robotic devices 390 that are intended for other purposes and merely associated with the system 300 for use in appropriate circumstances. For instance, a robotic vacuum cleaner device may be associated with the monitoring system 300 as one of the robotic devices 390 and may be controlled to take action responsive to monitoring system events.

In some examples, the robotic devices 390 automatically navigate within a property. In these examples, the robotic devices 390 include sensors and control processors that guide movement of the robotic devices 390 within the property. For instance, the robotic devices 390 may navigate within the property using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices 390 may include control processors that process output from the various sensors and control the robotic devices 390 to move along a path that reaches the desired destination and avoids obstacles. In this regard, the control processors detect walls or other obstacles in the property and guide movement of the robotic devices 390 in a manner that avoids the walls and other obstacles.

In addition, the robotic devices 390 may store data that describes attributes of the property. For instance, the robotic devices 390 may store a floorplan of a building on the property and/or a three-dimensional model of the property that enables the robotic devices 390 to navigate the property. During initial configuration, the robotic devices 390 may receive the data describing attributes of the property, determine a frame of reference to the data (e.g., a property or reference location in the property), and navigate the property based on the frame of reference and the data describing attributes of the property. Further, initial configuration of the robotic devices 390 also may include learning of one or more navigation patterns in which a user provides input to control the robotic devices 390 to perform a specific navigation action (e.g., fly to an upstairs bedroom and spin around while capturing video and then return to a home charging base). In this regard, the robotic devices 390 may learn and store the navigation patterns such that the robotic devices 390 may automatically repeat the specific navigation actions upon a later request.

In some examples, the robotic devices 390 may include data capture and recording devices. In these examples, the robotic devices 390 may include one or more cameras, one or more motion sensors, one or more microphones, one or more biometric data collection tools, one or more temperature sensors, one or more humidity sensors, one or more air flow sensors, and/or any other types of sensors that may be useful in capturing monitoring data related to the property and users at the property. The one or more biometric data collection tools may be configured to collect biometric samples of a person in the property with or without contact of the person. For instance, the biometric data collection tools may include a fingerprint scanner, a hair sample collection tool, a skin cell collection tool, and/or any other tool that allows the robotic devices 390 to take and store a biometric sample that can be used to identify the person (e.g., a biometric sample with DNA that can be used for DNA testing).

In some implementations, one or more of the thermal cameras 330 may be mounted on one or more of the robotic devices 390.

In some implementations, the robotic devices 390 may include output devices. In these implementations, the robotic devices 390 may include one or more displays, one or more speakers, and/or any type of output devices that allow the robotic devices 390 to communicate information to a nearby user.

The robotic devices 390 also may include a communication module that enables the robotic devices 390 to communicate with the control unit 310, each other, and/or other devices. The communication module may be a wireless communication module that allows the robotic devices 390 to communicate wirelessly. For instance, the communication module may be a Wi-Fi module that enables the robotic devices 390 to communicate over a local wireless network at the property. The communication module further may be a 900 MHz wireless communication module that enables the robotic devices 390 to communicate directly with the control unit 310. Other types of short-range wireless communication protocols, such as Bluetooth, Bluetooth LE, Z-wave, Zigbee, etc., may be used to allow the robotic devices 390 to communicate with other devices in the property. In some implementations, the robotic devices 390 may communicate with each other or with other devices of the system 300 through the network 305.

The robotic devices 390 further may include processor and storage capabilities. The robotic devices 390 may include any suitable processing devices that enable the robotic devices 390 to operate applications and perform the actions described throughout this disclosure. In addition, the robotic devices 390 may include solid state electronic storage that enables the robotic devices 390 to store applications, configuration data, collected sensor data, and/or any other type of information available to the robotic devices 390.

The robotic devices 390 can be associated with one or more charging stations. The charging stations may be located at predefined home base or reference locations at the property. The robotic devices 390 may be configured to navigate to the charging stations after completion of tasks needed to be performed for the monitoring system 300. For instance, after completion of a monitoring operation or upon instruction by the control unit 310, the robotic devices 390 may be configured to automatically fly to and land on one of the charging stations. In this regard, the robotic devices 390 may automatically maintain a fully charged battery in a state in which the robotic devices 390 are ready for use by the monitoring system 300.

The charging stations may be contact-based charging stations and/or wireless charging stations. For contact-based charging stations, the robotic devices 390 may have readily accessible points of contact that the robotic devices 390 are capable of positioning and mating with a corresponding contact on the charging station. For instance, a helicopter type robotic device 390 may have an electronic contact on a portion of its landing gear that rests on and mates with an electronic pad of a charging station when the helicopter type robotic device 390 lands on the charging station. The electronic contact on the robotic device 390 may include a cover that opens to expose the electronic contact when the robotic device 390 is charging and closes to cover and insulate the electronic contact when the robotic device is in operation.

For wireless charging stations, the robotic devices 390 may charge through a wireless exchange of power. In these cases, the robotic devices 390 need only locate themselves closely enough to the wireless charging stations for the wireless exchange of power to occur. In this regard, the positioning needed to land at a predefined home base or reference location in the property may be less precise than with a contact based charging station. Based on the robotic devices 390 landing at a wireless charging station, the wireless charging station outputs a wireless signal that the robotic devices 390 receive and convert to a power signal that charges a battery maintained on the robotic devices 390.

In some implementations, each of the robotic devices 390 has a corresponding and assigned charging station such that the number of robotic devices 390 equals the number of charging stations. In these implementations, the robotic devices 390 always navigate to the specific charging station assigned to that robotic device. For instance, a first robotic device 390 may always use a first charging station and a second robotic device 390 may always use a second charging station.

In some examples, the robotic devices 390 may share charging stations. For instance, the robotic devices 390 may use one or more community charging stations that are capable of charging multiple robotic devices 390. The community charging station may be configured to charge multiple robotic devices 390 in parallel. The community charging station may be configured to charge multiple robotic devices 390 in serial such that the multiple robotic devices 390 take turns charging and, when fully charged, return to a predefined home base or reference location in the property that is not associated with a charger. The number of community charging stations may be less than the number of robotic devices 390.

Also, the charging stations may not be assigned to specific robotic devices 390 and may be capable of charging any of the robotic devices 390. In this regard, the robotic devices 390 may use any suitable, unoccupied charging station when not in use. For instance, when one of the robotic devices 390 has completed an operation or is in need of battery charge, the control unit 310 references a stored table of the occupancy status of each charging station and instructs the robotic device 390 to navigate to the nearest charging station that is unoccupied.

The system 300 further includes one or more integrated security devices 380. The one or more integrated security devices may include any type of device used to provide alerts based on received sensor data. For instance, the one or more control units 310 may provide one or more alerts to the one or more integrated security input/output devices 380. Additionally, the one or more control units 310 may receive one or more sensor data from the sensors 320 and determine whether to provide an alert to the one or more integrated security input/output devices 380.

The sensors 320, the property automation controls 322, the thermal camera 330, the thermostat 334, and the integrated security devices 380 may communicate with the controller 312 over communication links 324, 326, 328, 332, and 384. The communication links 324, 326, 328, 332, and 384 may be a wired or wireless data pathway configured to transmit signals from the sensors 320, the property automation controls 322, the thermal camera 330, the thermostat 334, and the integrated security devices 380 to the controller 312. The sensors 320, the property automation controls 322, the thermal camera 330, the thermostat 334, and the integrated security devices 380 may continuously transmit sensed values to the controller 312, periodically transmit sensed values to the controller 312, or transmit sensed values to the controller 312 in response to a change in a sensed value.

The communication links 324, 326, 328, 332, and 384 may include a local network. The sensors 320, the property automation controls 322, the thermal camera 330, the thermostat 334, and the integrated security devices 380, and the controller 312 may exchange data and commands over the local network. The local network may include 802.11 "Wi-Fi" wireless Ethernet (e.g., using low-power Wi-Fi chipsets), Z-Wave, Zigbee, Bluetooth, "Homeplug" or other "Powerline" networks that operate over AC wiring, and a Category 4 (CATS) or Category 6 (CAT6) wired Ethernet network. The local network may be a mesh network constructed based on the devices connected to the mesh network.

The monitoring server 360 is one or more electronic devices configured to provide monitoring services by exchanging electronic communications with the control unit 310, the one or more user devices 340 and 350, and the central alarm station server 370 over the network 305. For example, the monitoring server 360 may be configured to monitor events (e.g., alarm events) generated by the control unit 310. In this example, the monitoring server 360 may exchange electronic communications with the network module 314 included in the control unit 310 to receive information regarding events (e.g., alerts) detected by the control unit 310. The monitoring server 360 also may receive information regarding events (e.g., alerts) from the one or more user devices 340 and 350.

In some examples, the monitoring server 360 may route alert data received from the network module 314 or the one or more user devices 340 and 350 to the central alarm station server 370. For example, the monitoring server 360 may transmit the alert data to the central alarm station server 370 over the network 305.

The monitoring server 360 may store sensor data, thermal image data, and other monitoring system data received from the monitoring system and perform analysis of the sensor data, thermal image data, and other monitoring system data received from the monitoring system. Based on the analysis, the monitoring server 360 may communicate with and control aspects of the control unit 310 or the one or more user devices 340 and 350.

The monitoring server 360 may provide various monitoring services to the system 300. For example, the monitoring server 360 may analyze the sensor, thermal image, and other data to determine an activity pattern of a resident of the property monitored by the system 300. In some implementations, the monitoring server 360 may analyze the data for alarm conditions or may determine and perform actions at the property by issuing commands to one or more of the automation controls 322, possibly through the control unit 310.

The central alarm station server 370 is an electronic device configured to provide alarm monitoring service by exchanging communications with the control unit 310, the one or more mobile devices 340 and 350, and the monitoring server 360 over the network 305. For example, the central alarm station server 370 may be configured to monitor alerting events generated by the control unit 310. In this example, the central alarm station server 370 may exchange communications with the network module 314 included in the control unit 310 to receive information regarding alerting events detected by the control unit 310. The central alarm station server 370 also may receive information regarding alerting events from the one or more mobile devices 340 and 350 and/or the monitoring server 360.

The central alarm station server 370 is connected to multiple terminals 372 and 374. The terminals 372 and 374 may be used by operators to process alerting events. For example, the central alarm station server 370 may route alerting data to the terminals 372 and 374 to enable an operator to process the alerting data. The terminals 372 and 374 may include general-purpose computers (e.g., desktop personal computers, workstations, or laptop computers) that are configured to receive alerting data from a server in the central alarm station server 370 and render a display of information based on the alerting data. For instance, the controller 312 may control the network module 314 to transmit, to the central alarm station server 370, alerting data indicating that a sensor 320 detected motion from a motion sensor via the sensors 320. The central alarm station server 370 may receive the alerting data and route the alerting data to the terminal 372 for processing by an operator associated with the terminal 372. The terminal 372 may render a display to the operator that includes information associated with the alerting event (e.g., the lock sensor data, the motion sensor data, the contact sensor data, etc.) and the operator may handle the alerting event based on the displayed information.

In some implementations, the terminals 372 and 374 may be mobile devices or devices designed for a specific function. Although FIG. 3 illustrates two terminals for brevity, actual implementations may include more (and, perhaps, many more) terminals.

The one or more authorized user devices 340 and 350 are devices that host and display user interfaces. For instance, the user device 340 is a mobile device that hosts or runs one or more native applications (e.g., the smart home application 342). The user device 340 may be a cellular phone or a non-cellular locally networked device with a display. The user device 340 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 340 may perform functions unrelated to the monitoring system, such as placing personal telephone calls, playing music, playing video, displaying pictures, browsing the Internet, maintaining an electronic calendar, etc.

The user device 340 includes a smart home application 342. The smart home application 342 refers to a software/firmware program running on the corresponding mobile device that enables the user interface and features described throughout. The user device 340 may load or install the smart home application 342 based on data received over a network or data received from local media. The smart home application 342 runs on mobile devices platforms, such as iPhone, iPod touch, Blackberry, Google Android, Windows Mobile, etc. The smart home application 342 enables the user device 340 to receive and process image and sensor data from the monitoring system.

The user device 350 may be a general-purpose computer (e.g., a desktop personal computer, a workstation, or a laptop computer) that is configured to communicate with the monitoring server 360 and/or the control unit 310 over the network 305. The user device 350 may be configured to display a smart home user interface 352 that is generated by the user device 350 or generated by the monitoring server 360. For example, the user device 350 may be configured to display a user interface (e.g., a web page) provided by the monitoring server 360 that enables a user to perceive images captured by the thermal camera 330 and/or reports related to the monitoring system. Although FIG. 3 illustrates two user devices for brevity, actual implementations may include more (and, perhaps, many more) or fewer user devices.

The smart home application 342 and the smart home user interface 352 can allow a user to interface with the property monitoring system 300, for example, allowing the user to view monitoring system settings, adjust monitoring system parameters, customize monitoring system rules, and receive and view monitoring system messages.

In some implementations, the one or more user devices 340 and 350 communicate with and receive monitoring system data from the control unit 310 using the communication link 338. For instance, the one or more user devices 340 and 350 may communicate with the control unit 310 using various local wireless protocols such as Wi-Fi, Bluetooth, Z-wave, Zigbee, HomePlug (ethernet over power line), or wired protocols such as Ethernet and USB, to connect the one or more user devices 340 and 350 to local security and automation equipment. The one or more user devices 340 and 350 may connect locally to the monitoring system and its sensors and other devices. The local connection may improve the speed of status and control communications because communicating through the network 305 with a remote server (e.g., the monitoring server 360) may be significantly slower.

Although the one or more user devices 340 and 350 are shown as communicating with the control unit 310, the one or more user devices 340 and 350 may communicate directly with the sensors 320 and other devices controlled by the control unit 310. In some implementations, the one or more user devices 340 and 350 replace the control unit 310 and perform the functions of the control unit 310 for local monitoring and long range/offsite communication.

In other implementations, the one or more user devices 340 and 350 receive monitoring system data captured by the control unit 310 through the network 305. The one or more user devices 340, 350 may receive the data from the control unit 310 through the network 305 or the monitoring server 360 may relay data received from the control unit 310 to the one or more user devices 340 and 350 through the network 305. In this regard, the monitoring server 360 may facilitate communication between the one or more user devices 340 and 350 and the monitoring system 300.

In some implementations, the one or more user devices 340 and 350 may be configured to switch whether the one or more user devices 340 and 350 communicate with the control unit 310 directly (e.g., through link 338) or through the monitoring server 360 (e.g., through network 305) based on a location of the one or more user devices 340 and 350. For instance, when the one or more user devices 340 and 350 are located close to the control unit 310 and in range to communicate directly with the control unit 310, the one or more user devices 340 and 350 use direct communication. When the one or more user devices 340 and 350 are located far from the control unit 310 and not in range to communicate directly with the control unit 310, the one or more user devices 340 and 350 use communication through the monitoring server 360.

Although the one or more user devices 340 and 350 are shown as being connected to the network 305, in some implementations, the one or more user devices 340 and 350 are not connected to the network 305. In these implementations, the one or more user devices 340 and 350 communicate directly with one or more of the monitoring system components and no network (e.g., Internet) connection or reliance on remote servers is needed.

In some implementations, the one or more user devices 340 and 350 are used in conjunction with only local sensors and/or local devices in a house. In these implementations, the system 300 includes the one or more user devices 340 and 350, the sensors 320, the property automation controls 322, the thermal camera 330, and the robotic devices 390. The one or more user devices 340 and 350 receive data directly from the sensors 320, the property automation controls 322, the thermal camera 330, and the robotic devices 390 (i.e., the monitoring system components) and sends data directly to the monitoring system components. The one or more user devices 340, 350 provide the appropriate interfaces/processing to provide visual surveillance and reporting.

In other implementations, the system 300 further includes network 305 and the sensors 320, the property automation controls 322, the thermal camera 330, the thermostat 334, and the robotic devices 39 are configured to communicate sensor and image data to the one or more user devices 340 and 350 over network 305 (e.g., the Internet, cellular network, etc.). In yet another implementation, the sensors 320, the property automation controls 322, the thermal camera 330, the thermostat 334, and the robotic devices 390 (or a component, such as a bridge/router) are intelligent enough to change the communication pathway from a direct local pathway when the one or more user devices 340 and 350 are in close physical proximity to the sensors 320, the property automation controls 322, the thermal camera 330, the thermostat 334, and the robotic devices 390 to a pathway over network 305 when the one or more user devices 340 and 350 are farther from the sensors 320, the property automation controls 322, the thermal camera 330, the thermostat 334, and the robotic devices 390. In some examples, the system leverages GPS information from the one or more user devices 340 and 350 to determine whether the one or more user devices 340 and 350 are close enough to the monitoring system components to use the direct local pathway or whether the one or more user devices 340 and 350 are far enough from the monitoring system components that the pathway over network 305 is required. In other examples, the system leverages status communications (e.g., pinging) between the one or more user devices 340 and 350 and the sensors 320, the property automation controls 322, the thermal camera 330, the thermostat 334, and the robotic devices 390 to determine whether communication using the direct local pathway is possible. If communication using the direct local pathway is possible, the one or more user devices 340 and 350 communicate with the sensors 320, the property automation controls 322, the thermal camera 330, the thermostat 334, and the robotic devices 390 using the direct local pathway. If communication using the direct local pathway is not possible, the one or more user devices 340 and 350 communicate with the monitoring system components using the pathway over network 305.

In some implementations, the system 300 provides end users with access to thermal images captured by the thermal camera 330 to aid in decision making. The system 300 may transmit the thermal images captured by the thermal camera 330 over a wireless WAN network to the user devices 340 and 350. Because transmission over a wireless WAN network may be relatively expensive, the system 300 can use several techniques to reduce costs while providing access to significant levels of useful visual information (e.g., compressing data, down-sampling data, sending data only over inexpensive LAN connections, or other techniques).

In some implementations, a state of the monitoring system and other events sensed by the monitoring system may be used to enable/disable video/image recording devices (e.g., the thermal camera 330 or other cameras of the system 300). In these implementations, the thermal camera 330 may be set to capture thermal images on a periodic basis when the alarm system is armed in an "armed away" state, but set not to capture images when the alarm system is armed in an "armed stay" or "unarmed" state. In addition, the thermal camera 330 may be triggered to begin capturing thermal images when the alarm system detects an event, such as an alarm event, a door-opening event for a door that leads to an area within a field of view of the thermal camera 330, or motion in the area within the field of view of the thermal camera 330. In other implementations, the thermal camera 330 may capture images continuously, but the captured images may be stored or transmitted over a network when needed.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random-access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A method comprising:

receiving, from a camera located at a property, one or more images depicting a person at the property;

determining, using the images, whether the person at the property performed a gesture;

in response to determining that the person at the property performs the gesture, determining contact information for a second person;

identifying one or more objects in the images;

determining, using the identified one or more objects, one or more actions to perform, wherein the one or more actions to perform comprise an operation to open, close, lock, or unlock a door; and establishing a communication connection to a device for the second person.

2. The method of claim 1, comprising:
determining, using the images from the camera located at the property, a location of the person at the property; and
providing, using the communication connection, information representing the location to the device for presentation.

3. The method of claim 1, wherein determining, using the identified one or more objects, the one or more actions to perform comprises:
determining the contact information for the second person.

4. The method of claim 1, wherein determining, using the identified one or more objects, the one or more actions to perform comprises:
determining to establish the communication connection to the device for the second person.

5. The method of claim 1, comprising:
establishing the communication connection to the device for the second person, wherein the second person is emergency personnel.

6. The method of claim 5, comprising:
providing a notification to the emergency personnel using data that identifies the gesture performed by the person at the property.

7. The method of claim 1, comprising:
providing, using the communication connection, the images to the device for the second person.

8. The method of claim 7, wherein providing, using the communication connection, the images to the device for the second person comprises:
providing, using the communication connection, the images to a device of emergency personnel.

9. The method of claim 1, wherein determining the contact information for the second person comprises:
comparing gesture data indicating the performed gesture with contact data indicating existing contact information stored in a contact information database, wherein the contact data includes the contact information for the second person, wherein the contact information for the second person is stored in an entry of a database, and wherein the entry includes additional data that at least substantially matches the gesture data; and
determining, using the comparison, that the gesture data at least substantially matches the additional data that indicates the contact information for the second person.

10. A system comprising one or more computers and one or more storage devices on which are stored instructions that are operable, when executed by the one or more computers, to cause the one or more computers to perform operations comprising:
receiving, from a camera located at a property, one or more images depicting a person at the property;
determining, using the images, whether the person at the property performed a gesture;
in response to determining that the person at the property performs the gesture, determining contact information for a second person;
identifying one or more objects in the images;
determining, using the identified one or more objects, one or more actions to perform, wherein the one or more actions to perform comprise an operation to open, close, lock, or unlock a door; and
establishing a communication connection to a device for the second person.

11. The system of claim 10, wherein the operations comprise:
determining, using the images from the camera located at the property, a location of the person at the property; and
providing, using the communication connection, information representing the location to the device for presentation.

12. The system of claim 10, wherein determining, using the identified one or more objects, the one or more actions to perform comprises:
determining the contact information for the second person.

13. The system of claim 10, wherein determining, using the identified one or more objects, the one or more actions to perform comprises:
determining to establish the communication connection to the device for the second person.

14. The system of claim 10, wherein the operations comprise:
establishing the communication connection to the device for the second person, wherein the second person is emergency personnel.

15. The system of claim 14, wherein the operations comprise:
providing a notification to the emergency personnel using data that identifies the gesture performed by the person at the property.

16. The system of claim 10, wherein the operations comprise:
providing, using the communication connection, the images to the device for the second person.

17. The system of claim 16, wherein providing, using the communication connection, the images to the device for the second person comprises:
providing, using the communication connection, the images to a device of emergency personnel.

18. The system of claim 10, wherein determining the contact information for the second person comprises:
comparing gesture data indicating the performed gesture with contact data indicating existing contact information stored in a contact information database, wherein the contact data includes the contact information for the second person, wherein the contact information for the second person is stored in an entry of a database, and wherein the entry includes additional data that at least substantially matches the gesture data; and
determining, using the comparison, that the gesture data at least substantially matches the additional data that indicates the contact information for the second person.

19. One or more non-transitory computer storage media encoded with instructions that, when executed by one or more computers, cause the one or more computers to perform operations comprising:
receiving, from a camera located at a property, one or more images depicting a person at the property;
determining, using the images, whether the person at the property performed a gesture;
in response to determining that the person at the property performs the gesture, determining contact information for a second person;
identifying one or more objects in the images;
determining, using the identified one or more objects, one or more actions to perform, wherein the one or more actions to perform comprise an operation to open, close, lock, or unlock a door; and establishing a communication connection to a device for the second person.

20. The media of claim 19, wherein determining the contact information for the second person comprises:
   comparing gesture data indicating the performed gesture with contact data indicating existing contact information stored in a contact information database, wherein the contact data includes the contact information for the second person, wherein the contact information for the second person is stored in an entry of a database, and wherein the entry includes additional data that at least substantially matches the gesture data; and
   determining, using the comparison, that the gesture data at least substantially matches the additional data that indicates the contact information for the second person.

\* \* \* \* \*